US010209396B2

(12) United States Patent
Pennison et al.

(10) Patent No.: US 10,209,396 B2
(45) Date of Patent: Feb. 19, 2019

(54) COMBINED RADIOACTIVE SOURCE FOR GAMMA-NEUTRON TOOL

(71) Applicant: Halliburton Energy Services, Inc., Houston, TX (US)

(72) Inventors: Robert Wayne Pennison, Spring, TX (US); Paul Andrew Cooper, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/555,645

(22) PCT Filed: Nov. 5, 2015

(86) PCT No.: PCT/US2015/059291
§ 371 (c)(1),
(2) Date: Sep. 5, 2017

(87) PCT Pub. No.: WO2017/078721
PCT Pub. Date: May 11, 2017

(65) Prior Publication Data
US 2018/0045849 A1    Feb. 15, 2018

(51) Int. Cl.
*G01V 5/14* (2006.01)
*G01V 5/10* (2006.01)
*G01V 5/12* (2006.01)

(52) U.S. Cl.
CPC ............ *G01V 5/145* (2013.01); *G01V 5/10* (2013.01); *G01V 5/12* (2013.01)

(58) Field of Classification Search
CPC ...................................... G01V 5/145
See application file for complete search history.

(56) References Cited

U.S. PATENT DOCUMENTS

| 2,967,245 | A |   | 1/1961 | Soloway |
| 3,435,215 | A |   | 3/1969 | Pritchett |
| 3,521,065 | A |   | 7/1970 | Locke |
| 3,702,932 | A |   | 11/1972 | Tanner et al. |
| 4,439,675 | A | * | 3/1984 | Campbell ............... G01V 5/14 250/253 |

(Continued)

FOREIGN PATENT DOCUMENTS

| FR | 2082318 A5 | 12/1971 |
| WO | 2013/012629 A1 | 1/2013 |
| WO | 2014/127452 A1 | 8/2014 |

OTHER PUBLICATIONS

International Preliminary Report on Patentability in related PCT application No. PCT/US2015/059291 dated May 17, 2018, 10 pages.

(Continued)

*Primary Examiner* — Mark R Gaworecki
(74) *Attorney, Agent, or Firm* — Benjamin Fite; Baker Botts L.L.P.

(57) ABSTRACT

A first set of radiation detectors may be disposable on the a drill string, wherein the first set of radiation detectors are capable of detecting gamma radiation and neutron radiation; and a combined chemical source spaced from the first set of radiation detectors, wherein the combined chemical source comprises a gamma radiation emitting material and a neutron radiation emitting material. The first set of radiation detectors and combined chemical source may be used in methods for logging a wellbore.

20 Claims, 3 Drawing Sheets

(56) References Cited

U.S. PATENT DOCUMENTS

| | | | |
|---|---|---|---|
| 4,883,956 | A | 11/1989 | Melcher et al. |
| 4,945,233 | A | 7/1990 | Jorro |
| 5,184,692 | A | 2/1993 | Moriarty |
| 6,389,367 | B1 | 5/2002 | Plasek |
| 6,825,459 | B2 | 11/2004 | Bothner |
| 7,081,616 | B2 | 7/2006 | Grau et al. |
| 7,633,058 | B2 | 12/2009 | Stoller et al. |
| 7,642,507 | B2 | 1/2010 | Radtke et al. |
| 8,421,004 | B2 | 4/2013 | Molz et al. |
| 8,431,885 | B2 | 4/2013 | Roscoe et al. |
| 8,436,294 | B2 | 5/2013 | Inanc et al. |
| 8,695,728 | B2 | 4/2014 | Trinh et al. |
| 2003/0155121 | A1 | 8/2003 | Jones et al. |
| 2004/0065823 | A1 | 4/2004 | Mickael |
| 2005/0028586 | A1 | 2/2005 | Smits et al. |
| 2006/0054803 | A1 | 3/2006 | Labous et al. |
| 2007/0241275 | A1 | 10/2007 | Guo et al. |
| 2010/0024613 | A1 | 2/2010 | Choi |
| 2012/0043458 | A1* | 2/2012 | Herr .................... G01T 1/20 250/239 |
| 2012/0197529 | A1 | 8/2012 | Stephenson et al. |
| 2013/0105678 | A1 | 5/2013 | Wilson et al. |
| 2013/0105679 | A1 | 5/2013 | Climent |
| 2013/0206973 | A1 | 8/2013 | Kovtoun et al. |
| 2014/0097335 | A1 | 4/2014 | Inanc et al. |
| 2015/0155589 | A1 | 6/2015 | Hall et al. |
| 2015/0226875 | A1 | 8/2015 | Climent et al. |

OTHER PUBLICATIONS

International Search Report and Written Opinion issued in related PCT Application No. PCT/US2015/059291 dated Jul. 28, 2016, 13 pages.

Extended European Search Report issued in EP application No. 15 907 964.9, dated Aug. 13, 2018, 10 pages.

* cited by examiner

COMBINED RADIOACTIVE SOURCE FOR GAMMA-NEUTRON TOOL

CROSS-REFERENCE TO RELATED APPLICATION

The present application is a U.S. National Stage Application of International Application No. PCT/US2015/059291 filed Nov. 5, 2015, which is incorporated herein by reference in its entirety for all purposes.

BACKGROUND

The present disclosure relates generally to radiation detector systems and, more particularly, to detecting one or more properties of a compositions, such as a geological composition.

Radiation-based spectroscopy can be used to understand and identify the properties of various compositions. For example, gamma-ray spectroscopy involves detecting elements of a composition emitting gamma rays to determine materials contained within the composition. In addition, in some cases, the composition may be exposed to radiation in order to induce materials within the composition to emit radiation in response. This induced radiation may also be detected to provide further information regarding the materials contained within the composition.

For example, during a wellbore drilling operation, information regarding the composition of the formation through which the wellbore is drilled may be collected either while the wellbore is being drilled or after a portion of the wellbore has been drilled. The density of the formation is typically used to determine the formation porosity. The measured porosity properties of the formation is then used to estimate the geological make up of the formation. Neutron logging is used to determine the hydrocarbon content of the surrounding formation. As such, both density logging and neutron logging are typically used during a wellbore drilling operation to provide insight into the formation being drilled.

However, such radiation-based spectroscopy use chemical sources that emit gamma radiation and neutron radiation, respectfully. These chemical sources typically emit dangerous levels of radiation and must be handled with care to avoid personnel receiving unnecessary doses of radiation. At the same time, the detector system is often handled or assembled by a number of workers in proximity with the radioactive chemical source.

FIGURES

Some specific exemplary embodiments of the disclosure may be understood by referring, in part, to the following description and the accompanying drawings.

Figure 1:
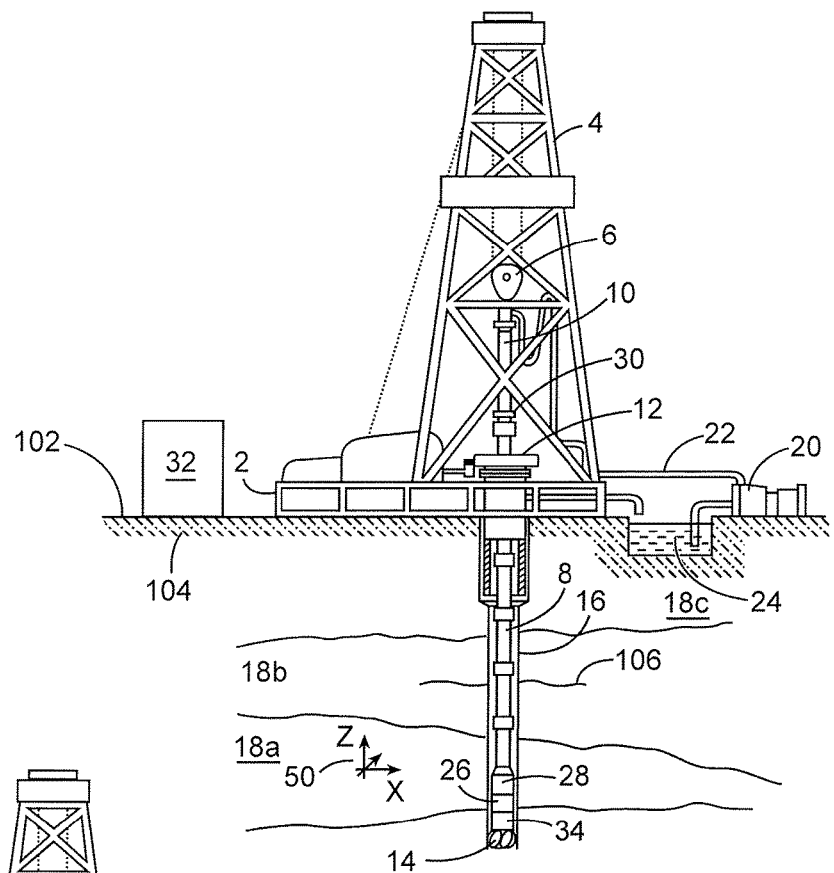
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to radiation detector systems and, more particularly, to detecting one or more properties of a compositions, such as a geological composition.

The present disclosure may be used to limit and otherwise reduce the exposure to personnel of radiation emitted by radiation source(s) used in conducting a density and/or neutron logging operation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

FIG. 1 is a diagram of a subterranean drilling system 100, according to aspects of the present disclosure. The drilling system 100 comprises a drilling platform 2 positioned at the surface 102. In the embodiment shown, the surface 102 comprises the top of a formation 104 containing one or more rock strata or layers 18a-c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor 34 and/or rotation of the drill string 8 by the rotary table 12. As bit 14 rotates, it creates a borehole 16 that passes through one or more rock strata or layers 18a-c.

A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16. In certain embodiments, the downhole motor 34 may comprise a turbine motor.

The drilling system 100 may comprise a bottom hole assembly (BHA) coupled to the drill string 8 near the drill bit 14. The BHA may comprise a detector system 26, and various downhole measurement tools and sensors and LWD and MWD elements. The detector system 26 may comprise at least one transmitter and receiver capable of communicating with adjacent and/or proximate tool electronics located on the drill string 8. In certain embodiments, the orientation and position of the drill bit 14 and/or the detector system 26 may be tracked using, for example, an azimuthal orientation indicator, which may include magnetometers, inclinometers, and/or accelerometers, though other sensor types such as gyroscopes may be used in some embodiments.

In certain embodiments, the detector system 26 may also include a control unit (not shown) coupled to transmitters and receivers that controls their operation, stores measurements, and in certain instances processes measurements from the detector system 26. Example control units may include microcontrollers and microcomputers and any other device that contains at least one processor communicably coupled to memory devices containing a set of instructions that when executed by the processor, cause it to perform certain actions. In certain embodiments, a control unit of the detector system 26 may be communicably coupled to other controllers within the BHA.

The tools and sensors of the BHA including the detector system 26 may be communicably coupled to a telemetry element 28. The telemetry element 28 may transfer measurements from the detector system 26 to a surface receiver 30 and/or to receive commands from the surface receiver 30. The telemetry element 28 may comprise a mud pulse telemetry system, acoustic telemetry system, wired communications system, wireless communications system, and/or any other type of communications system that would be appreciated by one of ordinary skill in the art in view of this disclosure. In certain embodiments, some or all of the measurements taken at the detector system 26 may also be stored in a memory within the detector system 26 or a memory in the telemetry element 28 for later retrieval at the surface 102.

In certain embodiments, the drilling system 100 may comprise an information handling system 32 positioned at the surface 102. The information handling system 32 may be communicably coupled to the surface receiver 30 and may receive measurements from the detector system 26 and/or transmit commands to the detector system 26 though the surface receiver 30. The information handling system 32 may also receive measurements from the detector system 26, when retrieved at the surface 102.

Figure 2:
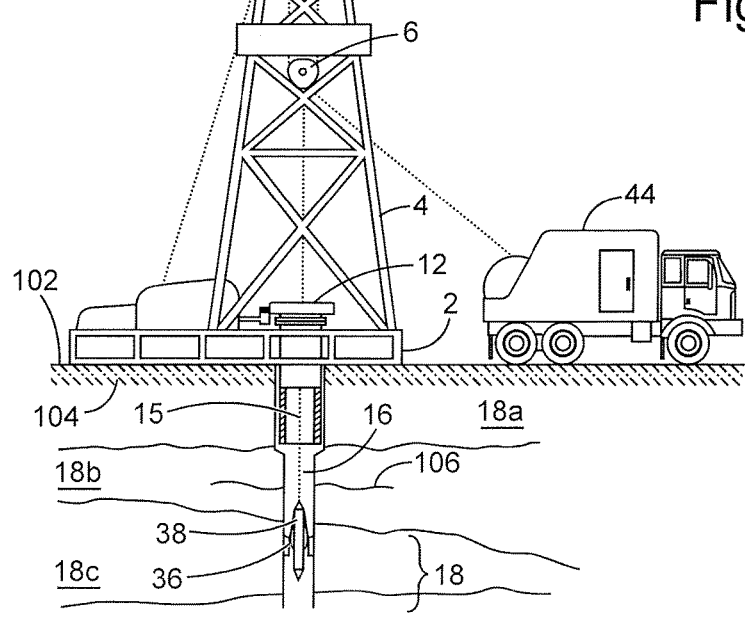
FIG. 2 is a diagram showing an illustrative wireline measurement system, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 38, i.e., an instrument that is suspended into the borehole 16 by a cable 15 having conductors for transporting power to the tool and telemetry from the tool body to the surface 102. In certain embodiments, the wireline tool 38 may comprise a detector system 36. A logging facility 44 (shown in FIG. 2 as a truck, although it may be any other structure) may collect measurements from the wireline tool 38, and may include computing facilities (including, e.g., a control unit) for controlling, processing, storing, and/or visualizing the measurements gathered by the detector system 36. The computing facilities may be communicatively coupled to the wireline tool 38 by way of the cable 15. In certain embodiments, the surface control unit 32 may serve as the computing facilities of the logging facility 44.

As an illustrative embodiment, the present disclosure discloses a drilling system comprising a detector system for measuring one or more parameters of the borehole. For example, the detector system may allow measurement of the composition of the borehole wall. The present disclosure discusses embodiments of, and methods for using, a novel detector system. For ease of explanation, the present disclosed discusses the detector system with reference to the illustrative use of the detector system in a wellbore installation, for example, to aid in logging a wellbore. However, the present disclosure does not intend to limit the use of the detector system to only embodiments where the elements of the detector system are disposed or mounted on a drill string or drilling system. For example, the detector system of the present disclosure may be used to detect properties of compositions in a laboratory or other surface setting without departing from the scope of the this disclosure.

Figure 3:
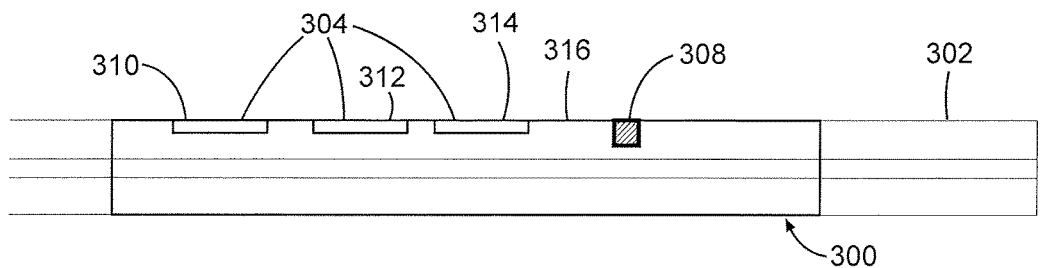
FIG. 3 is a diagram showing an illustrative detector system comprising a combined chemical source and a set of radiation detectors, according to aspects of the present disclosure.

For example, as shown in FIG. 3, a detector system 300 may be disposable on a drill string 302. The detector system 300 may comprise a chemical source 308. In certain embodiments, the chemical source 308 may be a combined chemical source comprising a gamma emitting material and a neutron emitting material. In certain embodiments, the gamma emitting material may comprise Cesium and/or Cobalt. For example, in certain embodiments, the gamma emitting material may comprise Cesium-137. In certain embodiments, the neutron emitting material may comprise Americium-Beryllium, and/or Californium. For example, in certain embodiments, the neutron emitting material may comprise Americium-241 and Beryllium (AmBe). In other embodiments, the neutron emitting material may comprise Californium-252 (Cf-252).

For purposes of illustration, the combined chemical source 308 is shown in FIGS. 3-6 disposed adjacent to an outer wall 316 of the detector system 300. However, as discussed herein with reference to FIGS. 7A-7B, in certain embodiments, the chemical source 308 may be disposed within the detector system 300. For example, in certain embodiments, the combined chemical source 308 may be disposed in a chemical source receptacle within the detector system 300.

The gamma emitting material may emit gamma radiation at a known energy. For example, where the gamma emitting material comprises Cesium, the gamma emitting material may emit gamma radiation at 662 keV. When gamma ray radiation is induced into a formation, the induced gamma rays interact with the formation and scatter. Neutrons emitted from the neutron emitting material may scatter in the formation.

The detector system 300 may comprise a set of radiation detectors 304. In certain embodiments, the set of radiation detectors 304 may be disposed on the outer wall 316 of detector system 300. In certain embodiments, the set of radiation detectors 304 may comprise a plurality of radiation detectors. For example, the set of radiation detectors 304 may comprise 2 to 15 radiation detectors. For example, FIG. 3 shows an embodiment wherein the set of radiation detectors 304 comprises a first radiation detector 310, a second radiation detector 312, and a third radiation detector 314. In certain embodiments, the set of radiation detectors 304 may comprise at least one combined radiation detector that is capable of detecting both gamma rays and neutron radiation. In certain embodiments, the combined radiation detector may separate the respective signals generated by gamma radiation and neutron radiation, sending the gamma radiation signal to gamma radiation measurement electronics and the neutron radiation signal to neutron radiation measurement electronics.

For example, in certain embodiments, each of the radiation detectors 310, 312, 314 may comprise a combined detector. In certain embodiments, the radiation detectors 310, 312, 314 may comprise any combination of gamma radiation detector, neutron detector, and/or combined detector. For example, in certain embodiments, the first radiation detector 310 may comprise a combined detector, the second radiation detector 312 may comprise a gamma ray detector, and the third radiation detector 314 may comprise a neutron detector.

In certain embodiments, gamma radiation detectors may comprise thallium-doped sodium iodide (NaI(Tl)) and/or any other material capable of detecting gamma radiation. In certain embodiments, neutron radiation detectors may comprise at least one helium-3 (He3) tube and/or any other material capable of detecting neutron radiation. In certain embodiments, combined detectors may comprise a material capable of detecting both gamma radiation and neutron radiation (for example, $Cs_2LiYCl_6$ (CYLC)). In certain embodiments, the combined detectors may comprise both a material capable of detecting gamma radiation (e.g., NaI (Tl)) and a material capable of detecting neutron radiation (e.g., a He3 tube). In certain embodiments, the radiation detector may be a combination detector comprising a gamma scintillating material (e.g., NaI(Tl)), a neutron scintillating material (e.g., one or more He3 tubes), and a scintillating material sensitive to both gamma radiation and neutron radiation (e.g., CYLC).

Figure 4:
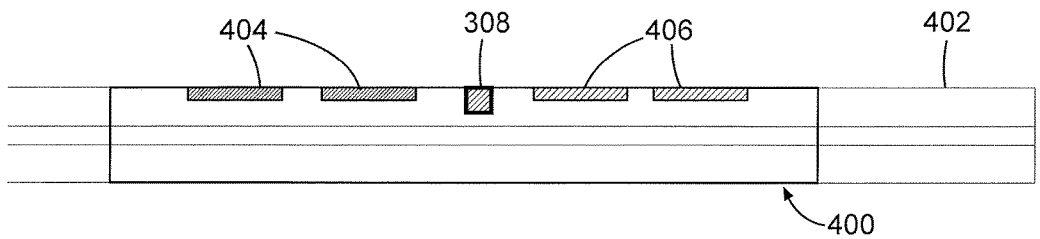
FIG. 4 is a diagram showing an illustrative detector system comprising a combined chemical source and two sets of radiation detectors, according to aspects of the present disclosure.

Referring now to FIG. 4, an illustrative embodiment of a detector system 400 is shown as disposed on a drill string 402. The detector system 400 may comprise the combined chemical source 308, a first set of radiation detectors 404 and a second set of radiation detectors 406. In certain embodiments, the first set of radiation detectors 404 may be separated from the second set of radiation detectors 406 by the combined chemical source 308. For example, in certain embodiments, the first set of radiation detectors 404 may be disposed above (or uphole from) the combined chemical source 308 and the second set of radiation detectors 406 may be disposed below the combined chemical source 308. In certain embodiments, the first set of radiation detectors 404 may comprise gamma detectors and the second set of radiation detectors 406 may comprise neutron detectors. In certain embodiments, the first set of radiation detectors 404 may comprise neutron detectors and the second set of radiation detectors 406 may comprise gamma detectors. In certain embodiments, the first set of radiation detectors 404 and/or the second set of radiation detectors 406 may comprise at least one combined detector capable of detecting both gamma and neutron radiation. For example, in certain embodiments, the first set of radiation detectors 404 may comprise combined detectors and the second set of radiation detectors 406 may comprise neutron detectors. The configuration shown by example in FIG. 4 may provide redundancy checks on detected measurements, and may allow the measurements of both gamma radiation logging and neutron radiation logging to be made from similar depths. As such, the electronics may process the gamma and neutron radiation measurements using a processor and calculate petrophysical calculations in real-time as the measurements are received, or in pseudo-real-time by calculating petrophysical calculations from a set of measurement data (i.e., several measurements over a time period).

Figure 5:
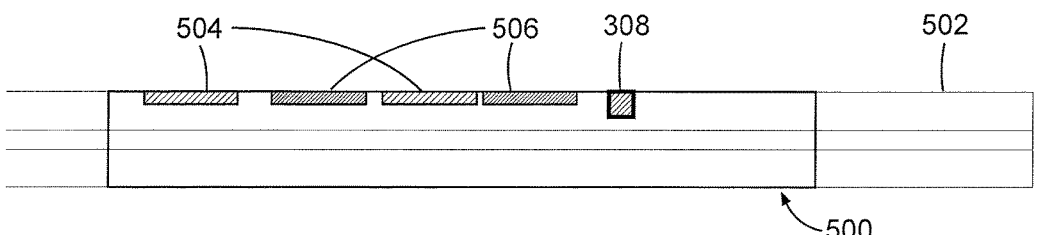
FIG. 5 is a diagram showing an illustrative detector system comprising a combined chemical source and two sets of radiation detectors interleaved with each other, according to aspects of the present disclosure.

Referring now to FIG. 5, an illustrative embodiment of a detector system 500 comprising the combined chemical source 308 is shown disposed on a drill string 502. The detector system 500 may comprise a first set of radiation detectors 504 and a second set of radiation detectors 506. In certain embodiments, the first set of radiation detectors 504 may be interposed with the second set of radiation detectors 506. For example, in certain embodiments, each radiation detector of the first set of radiation detectors 504 may be separated by a radiation detector of the second set of radiation detectors 506. In certain embodiments, the sets of radiation detectors 504, 506 may be disposed above the combined chemical source 308 (as shown by example in FIG. 5) or below the combined chemical source 308. In certain embodiments, the combined chemical source 308 may be disposed between radiation detectors of the interposed sets of radiation detectors 504, 506 such that at least one radiation detector is disposed uphole from the combined chemical source 308 and at least one radiation detector is disposed downhole from the combined chemical source 308.

In certain embodiments, the first set of radiation detectors 504 may comprise gamma detectors and the second set of radiation detectors 506 may comprise neutron detectors. In certain embodiments, the first set of radiation detectors 504 may comprise neutron detectors and the second set of radiation detectors 506 may comprise gamma detectors. In certain embodiments, the first set of radiation detectors 504 and/or the second set of radiation detectors 506 may comprise at least one combined detector capable of detecting both gamma and neutron radiation. For example, in certain embodiments, the first set of radiation detectors 504 may comprise combined detectors and the second set of radiation detectors 506 may comprise neutron detectors.

Figure 6:
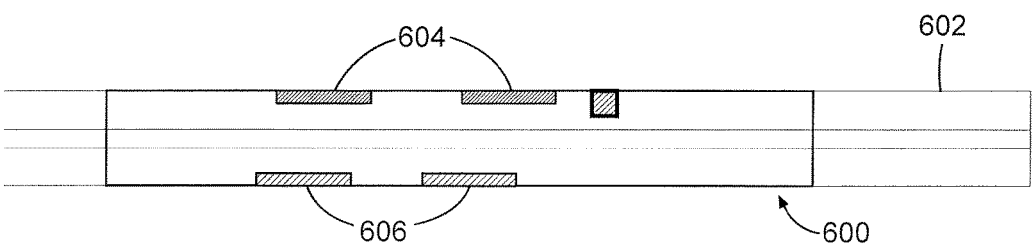
FIG. 6 is a diagram showing an illustrative detector system comprising a combined chemical source and two sets of radiation detectors on spaced axially away from each other on the detector system, according to aspects of the present disclosure.

Referring now to FIG. 6, an illustrative embodiment of a detector system 600 comprising the combined chemical source 308 is shown disposed on a drill string 602. The detector system 600 may comprise a first set of radiation detectors 604 and a second set of radiation detectors 606. In certain embodiments, the first set of radiation detectors 604 may be axially separated from the second set of radiation detectors 606. For example, in certain embodiments, the first set of radiation detectors 604 and the second set of radiation detectors 606 may be disposed on an opposite sides of the detector system 600 (i.e., the sets of radiation detectors 604, 606 may be disposed 180 degrees from each other).

In certain embodiments, the first set of radiation detectors 604 may comprise gamma detectors and the second set of radiation detectors 606 may comprise neutron detectors. In certain embodiments, the first set of radiation detectors 604 may comprise neutron detectors and the second set of radiation detectors 606 may comprise gamma detectors. In certain embodiments, the first set of radiation detectors 604 and/or the second set of radiation detectors 606 may comprise at least one combined detector capable of detecting both gamma and neutron radiation. For example, in certain embodiments, the first set of radiation detectors 604 may comprise combined detectors and the second set of radiation detectors 606 may comprise neutron detectors. The opposing configuration shown in FIG. 6 may make use of the greater depth of penetration of neutrons into the formation as compared to gamma radiation.

Placing the neutron detector is on the opposing side of the detector system from the combined chemical source 308 may take advantage of the different penetration depths of gamma radiation and neutron radiation. For example, the gamma rays may be collimated and have limited penetration into the formation as compared with neutron radiation which forms a neutron cloud around the combined chemical source 308. Emitted neutrons may penetrate into the formation on the oppose side of the detector system from the combined chemical source 308 while gamma radiation may be limited to interacting with the formation at or near the combined chemical source 308. Thus, the neutron detectors located on the opposing side of the detector system may see a signal induced from the neutron cloud while limiting the gamma radiation induce signal.

The above FIGS. 3-6 are provided as example embodiments of the detector system for the purpose of explanation and illustration. However, the detectors and chemical source of the detector system may be configured in many ways, as would be understood by one of ordinary skill with the benefit of the present disclosure. For example, in certain embodiments, the detector system may comprise 3 to 100 radiation detectors.

Figure 7A:
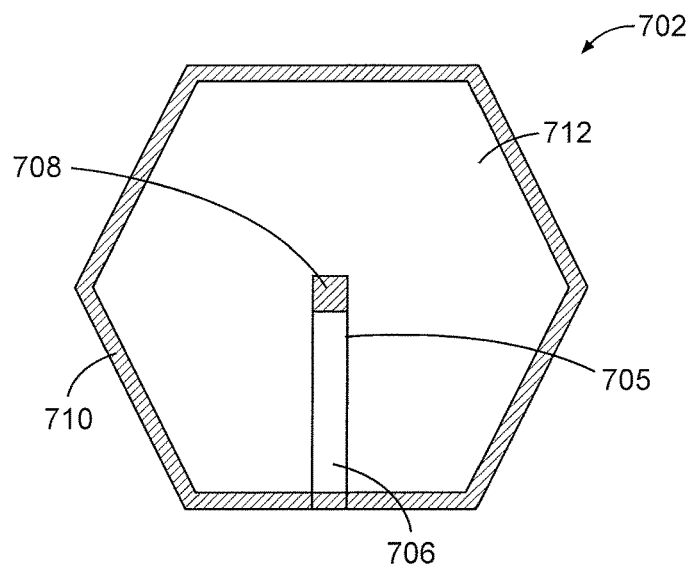
FIG. 7A is a top view diagram showing an illustrative containment pig of the detector system having a containment insert disposed within the containment pig, according to aspects of the present disclosure.
Figure 7B:
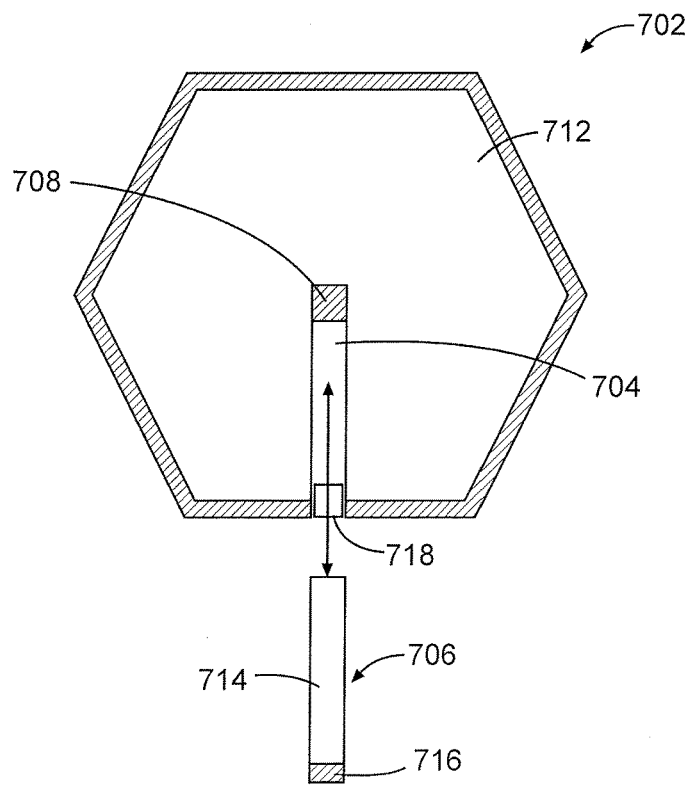
FIG. 7B is a top view diagram showing an illustrative containment pig of the detector system having a containment insert removed from the containment pig, according to aspects of the present disclosure.

Referring now to FIGS. 7A and 7B, a schematic view of an illustrative containment pig 702 is shown comprising a neutron radiation shield 712 defining the body of the containment pig 702 and an outer lining 710 disposed on the outside of the neutron radiation shield 712. The neutron radiation shield 712 may having a cylindroid, spheroid, cuboid, or other suitable geometry. The containment pig 702 may further comprise a chemical source slot 704 defined within the neutron radiation shield 712. The combined chemical source 708 may be disposed within the chemical source slot 704.

The containment pig 702 may be suitable for safely transporting the combined chemical source and/or storing the combined chemical source. In certain embodiments, the neutron radiation shield 712 may be capable of blocking substantially all neutron radiation. For example, in certain embodiments, when the combined chemical source 708 is located within the containment pig 702, the neutron radiation shield 712 and/or the outer lining 710 may limit the radiation received at a distance of one meter from the containment pig 702 surface to 10 mREM/hr or less (for example, by blocking or shielding gamma radiation and neutron radiation emitted from the combined chemical source 708). For example, in certain embodiments, the containment pig 708 may reduce the radiation received at one meter from the containment pig 702 to 5 mREM/hr or less.

In certain embodiments, when the combined chemical source 708 is located within the containment pig 702, the amount of radiation received by workers handling the containment pig 702 may be reduced to levels within limited allowed by applicable laws or regulations. For example, the containment pig 702 may block or otherwise reduce radiation limits to allowable levels under United States Pipeline and Hazardous Materials Safety Administration regulations for packages transporting radioactive materials (49 C.F.R. 178.350, et seq.), and/or United States Occupational Safety and Health Administration regulations (e.g., OSHA standard 1910.1096 regarding ionizing radiation exposure).

In certain embodiments, the neutron radiation shield 712 may comprise polyethylene and/or another high-hydrogen index material. In certain embodiments, the outer lining 710 may be capable of blocking substantially all gamma radiation. In certain embodiments, the outer lining 710 may be capable of blocking. For example, in certain embodiments, the outer lining 710 may comprise lead, tungsten, and/or another dense, high-atomic number material. In certain embodiments, the combined chemical source 708 may be attached to a containment slot wall 705. For example, in certain embodiments, the combined chemical source 708 may be screwed, bolted, fastened, and/or otherwise secured to the containment slot wall 705.

In certain embodiments, a containment insert 706 may be disposed within the chemical source slot 704. In certain embodiments, the containment insert 706 may comprise an insert neutron shield 714 and/or an outer insert lining 716. In certain embodiments, the containment insert 706 may be structured complementary to the containment pig 702. For example, the insert neutron shield 714 may comprise the same material as the neutron radiation shield 712 and/or the outer insert lining 716 may comprise the same material as the outer lining 710.

When the containment insert 706 is disposed within the chemical source slot 704, as shown by example in FIG. 7A, the containment pig 702 and containment insert 706 may block radiation emitted by the combined chemical source 708 from dispersing into the surrounding environment (i.e., outside the containment pig 702). In certain embodiments, the outer insert lining 716 may comprise the same material as the outer lining 710. When the containment insert 706 is fully inserted into the chemical source slot 704, the outer insert lining 716 may be adjacent to the outer lining 710. As a result, in certain embodiments, when the containment insert 706 is disposed within the chemical source slot 704, a worker handling or otherwise nearby the containment pig 702 may be substantially shielded from chemical source emitted radiation.

When the detector system is to be used, the containment insert 706 may be removed from the chemical source slot 704, as shown by example in FIG. 7B. Once the containment insert 706 is removed, the gamma and neutron radiation emitted from the combined chemical source may enter the surrounding environment through the chemical source slot 704. In certain embodiments, the containment insert 706 may be removed once the containment pig 702 and detector system is placed within the borehole. For example, the containment insert 706 may be removed remotely using a fishing tool and/or a downhole retrieval tool. In certain embodiments, the containment insert 706 may be removed at the surface before the detector system is placed within the borehole. For example, the containment insert 706 may be removed manually by a worker (preferably a radiation shielded worker). In certain embodiments, the containment insert 706 may be reinserted into the chemical source slot 704 after the detector system has finished taking measurements or is otherwise not in use.

In certain embodiments, the combined chemical source 708 may be attached to a positioning mechanism (not shown). The positioning mechanism may translate or otherwise move the combined chemical source 708 between a contained position within the containment pig 702 (shown in FIG. 7A) and a load position 718, as shown in FIG. 7B. In the load position 718, the combined chemical source 708 may be removed from the containment pig 702 and loaded into the detector system. For example, the combined chemical source 708 may be loaded into a chemical source receptacle disposed within the detector system, where the chemical source receptacle is structured and arranged to receive and secure the combined chemical source. While disposed within the chemical source receptacle, the combined chemical source may emit radiation into the surrounding environment (e.g., into the surrounding formation when the detector system is located in the borehole).

The containment pig 702 may shield personnel handling the combined chemical source from harmful doses of radiation. For example, personnel may need radiation protective equipment and gear only while transferring the combined chemical source from the containment pig to the detector system. This transfer of radioactive material may have a short duration on the order of seconds to minutes, for example. Therefore, the combined chemical source may reduce the potential sources of harmful radiation. Limiting the radiation sources may reduce incidents of accidental exposure to radiation and reduce the amount of radiation received by operation personnel. Using a sealed and/or resealable containment pig to shield the surrounding environment from radiation emitted by the chemical source while the detector system is not in use may also reduce the radiation received by operation personnel. Retracting and resealing the chemical source within containment pig after density and/or neutron logging operations are complete may further reduce radiation exposure to personnel.

In certain embodiments, the detector system of the present disclosure may be used in a method of logging a borehole. For example, a method of logging a borehole may comprise shielding a combined chemical source with a containment pig; transferring the combined chemical source to a detector system; radiating a formation with gamma radiation and neutron radiation into a formation from the combined chemical source; and detecting radiation induced from radiating the formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A system, comprising:
   a first set of radiation detectors disposable on a drill string, wherein the first set of radiation detectors are capable of detecting gamma radiation and neutron radiation;

a containment pig comprising a neutron radiation shield defining a body of the containment pig and an outer lining disposed on an outside of the neutron radiation shield; and a combined chemical source spaced from the first set of radiation detectors and disposed within the containment pig, wherein the combined chemical source comprises a gamma radiation emitting material and a neutron radiation emitting material, and wherein the neutron radiation shield blocks neutron radiation emitted from the combined chemical source and the outer lining blocks gamma radiation emitted from the combined chemical source.

2. The system of claim 1, wherein the gamma radiation emitting material comprises Cesium.

3. The system of claim 1, wherein the neutron radiation emitting material comprises Americium-Beryllium.

4. The system of claim 1, further comprising a second set of radiation detectors disposable on a drill string.

5. The system of claim 4, wherein the second set of radiation detectors are capable of detecting gamma radiation.

6. The system of claim 4, wherein the second set of radiation detectors are capable of detecting neutron radiation.

7. The system of claim 4, wherein the first set of radiation detectors, the second set of radiation detectors, and the combined chemical source are disposable along the length of a drill string such that the combined chemical source is between the first set of radiation detectors and the second set of radiation detectors.

8. The system of claim 1, wherein at least one radiation detector comprises CLYC having the chemical formula $Cs_2LiYCl_6$.

9. A system, comprising:

a containment pig comprising a neutron radiation shield defining a body of the containment pig and an outer lining disposed on an outside of the neutron radiation shield;

a chemical source slot defined within the containment pig;

a combined chemical source comprising a gamma radiation emitting material and a neutron radiation emitting material, wherein the combined chemical source is disposed within the chemical source slot, and wherein the neutron radiation shield blocks neutron radiation emitted from the combined chemical source and the outer lining blocks gamma radiation emitted from the combined chemical source; and wherein the combined chemical source is enclosed within the neutron radiation shield and the outer lining.

10. The system of claim 9, further comprising a removable containment insert disposed within the chemical source slot, wherein the containment insert and containment pig assembly substantially block radiation emitted from the combined radiation source from entering a surrounding environment.

11. The system of claim 9, wherein the gamma radiation emitting material comprises Cesium.

12. The system of claim 9, wherein the neutron radiation emitting material comprises Americium-Beryllium.

13. A method of logging a borehole, comprising:

shielding a combined chemical source with a containment pig, wherein the containment pig comprises a neutron radiation shield defining a body of the containment pig and outer lining disposed on an outside of the neutron radiation shield, wherein the neutron radiation shield blocks neutron radiation emitted from the combined chemical source and the outer lining blocks gamma radiation emitted from the combined chemical source;

transferring the combined chemical source to a detector system;

radiating a formation with gamma radiation and neutron radiation into a formation from the combined chemical source; and detecting radiation induced from radiating the formation.

14. The method of claim 13, wherein shielding a combined chemical source comprises blocking neutron radiation emitted from the combined chemical source with the neutron radiation shield and blocking gamma radiation emitted from the combined chemical source with the outer lining.

15. The method of claim 13, further comprising removing a containment insert from the containment pig prior to transferring the combined chemical source.

16. The method of claim 13, further comprising shielding the combined chemical source by placing the containment insert into the containment pig.

17. The method of claim 13, wherein detecting radiation induced from radiating the formation comprises detecting gamma radiation and neutron radiation with a set of combined radiation detectors.

18. The method of claim 13, wherein detecting radiation induced from radiating the formation comprises detecting gamma radiation with a first set of radiation detectors and detecting neutron radiation with a second set of radiation detectors.

19. The method of claim 13, further comprising determining a petrophysical property of the formation from the detected radiation.

20. The method of claim 19, wherein the petrophysical property of the formation is determined in real-time.

* * * * *